STEREOPHONIC SUBCARRIER SIGNAL GENERATOR
Filed Oct. 23, 1961
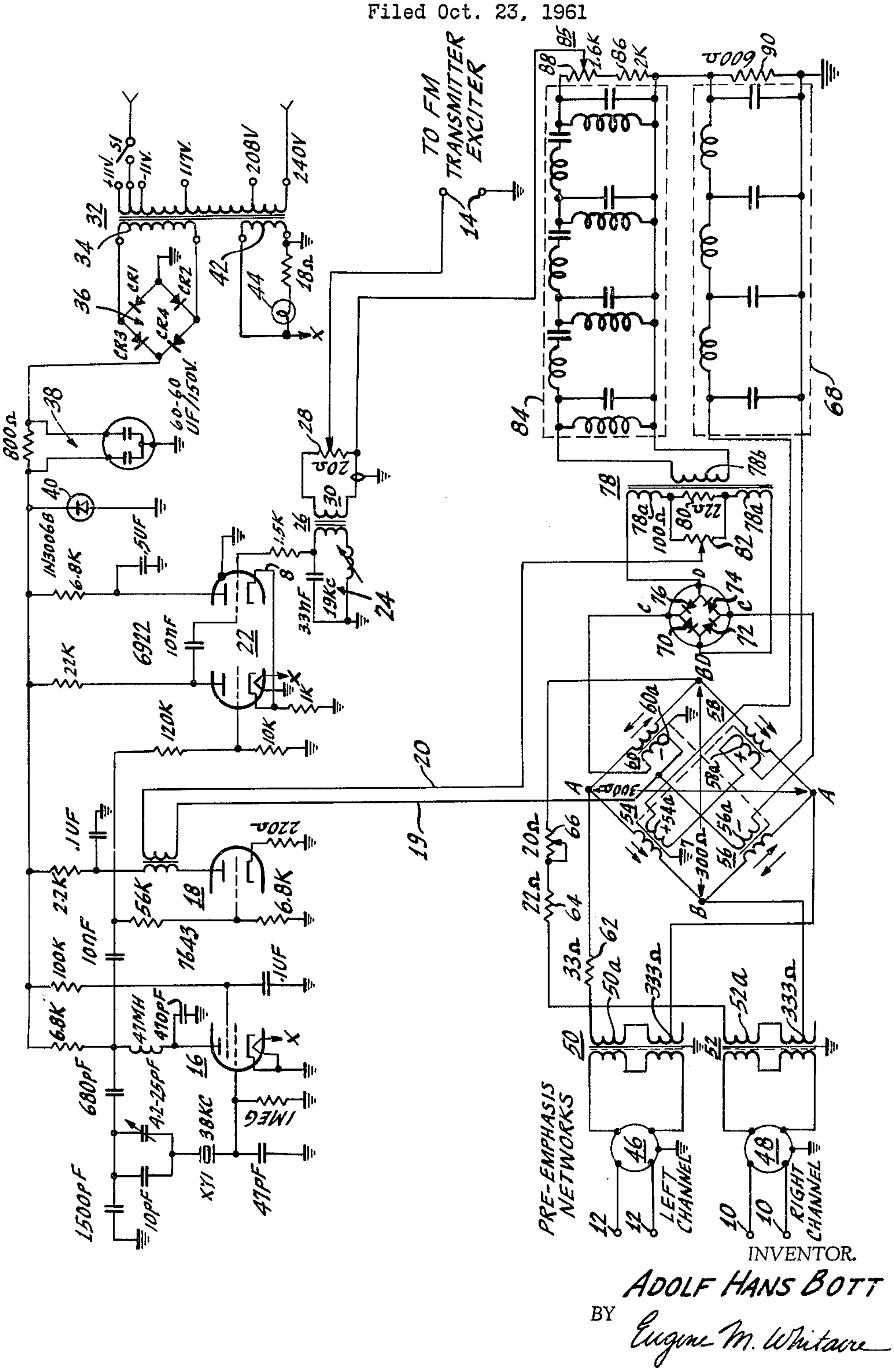
INVENTOR.
ADOLF HANS BOTT
BY Eugene M. Whitacre
ATTORNEY 3,231,673

STEREOPHONIC SUBCARRIER SIGNAL GENERATOR

Adolf Hans Bott, Haddonfield, N.J., assignor to Radio Corporation of America, a corporation of Delaware Filed Oct. 23, 1961, Ser. No. 146,785
8 Claims. (Cl. 179—15)

This invention relates to signal transmission systems and more particularly to subcarrier wave generators for adapting frequency modulation (FM) transmitters for the transmission of stereophonic sound signals.

The Federal Communications Commission (FCC) has recently authorized the transmission of stereophonic sound signals in the FM broadcast band. In the transmission of signals in accordance with the established standards, a matrix network is used to add and subtract stereophonic signals which may be derived from any suitable source such as spaced left and right microphones, to obtain a sum signal $(L+R)$ and a difference signal $(L-R)$. The difference signal $(L-R)$ is used to amplitude modulate a subcarrier wave of 38 kilocycles (kc.) in a manner to produce a double sideband suppressed subcarrier. A pilot tone signal of 19 kc., which is used at the receiver to demodulate the subcarrier wave, the sum signal $(L+R)$ and the subcarrier sidebands, are used to frequency modulate the main carrier wave which is transmitted. The transmitted signal is compatible with existing monophonic FM receivers since the sound from both stereophonic signal channels $(L+R)$ is demodulated and reproduced thereby. In addition, stereophonic receivers including demodulators for the main and sub-carrier waves are able to reconstruct the original left and right stereophonic signals to reproduce sound in auditory perspective.

Heretofore the proposals which have been made for processing the original right and left channel stereophonic signals to provide the complex signals necessary to frequency modulate the transmitted carrier wave have included complicated circuitry comprising a large number of electron tubes or transistors. These adaptors are expensive to build and correspondingly difficult to adjust and maintain because of the large number of circuit elements.

Accordingly it is an object of this invention to provide a simplified and relatively inexpensive stereophonic amplitude modulation double sideband suppressed subcarrier generator for FM transmitters.

A further object of this invention is to provide an improved and simplified circuit that is responsive to left and right stereophonic signals to matrix the left and right signals to produce sum and difference signals and to produce an amplitude modulated suppressed subcarrier wave corresponding to the difference signal.

Another object of this invention is to provide an improved stereophonic adaptor for FM transmitters including an improved circuit for developing and combining the amplitude modulated suppressed subcarrier sidebands corresponding to the difference between a pair of stereophonic signals, the sum of the stereophonic signals, and a pilot tone at half the frequency of the suppressed subcarrier.

A still further object of this invention is to provide an improved circuit for FM transmitters for the transmission of stereophonic sound signals which is simple and inexpensive to build, and which may be easily adjusted and maintained to provide reliable trouble free performance.

In accordance with the invention, the primary windings of four transformers are connected to form a bridge circuit. One of a pair of stereophonic signals is applied across one diagonal of the bridge, and the other of the stereophonic signals is applied across the other diagonal of the bridge. The sum of the stereophonic signals is developed across the primary windings of two of the transformers and induced into the secondary windings thereof. These secondary windings are connected in series aiding relation to apply the sum signals to a sum signal output circuit.

The difference between the stereophonic signals will be developed across the primary windings of the other two transformers and induced into their secondary windings. The difference signal secondary windings are connected in series aiding relation, and form one input circuit of a balanced modulator, the other balanced modulator input circuit being coupled to the subcarrier wave signal source which, for example, in accordance with the established standards has a frequency of 38 kc. A subcarrier sideband output circuit is coupled to the balanced modulator to develop the amplitude modulated double sideband suppressed subcarrier signal representative of the difference signal. Thus an important feature of the invention is the provision of a balanced modulator circuit in a stereophonic subcarrier generator for an FM transmitter whose input circuit comprises a portion of a transformer matrixing network.

In accordance with a feature of the invention, the sum signal and subcarrier sideband output circuits are connected in series with a third output circuit. A pilot tone signal of 19 kc. which bears a fixed phase relation to the 38 kc. subcarrier wave is developed across the third output circuit. The composite output signal from the three series connected output circuits is then fed to the exciter of an FM transmitter. The series connected output circuits provide a simple and efficient means for combining in the desired proportions, the sum $(L+R)$ signals, the sidebands of the suppressed subcarrier signal as amplitude modulated by the difference $(L-R)$ signal, and the 19 kc. pilot tone.

The novel features that are considered characteristic of this invention are set forth with particularity in the appended claims. The invention itself, however, both as to its organization and method of operation, as well as additional objects and advantages thereof, will best be understood from the following description, when read in connection with the accompanying drawings, in which the sole figure is a schematic circuit diagram of a stereophonic subcarrier signal generator for FM transmitters.

The stereophonic subcarrier generator has two pairs of input terminals 10 and 12 for connection to suitable right and left channel stereophonic sound signal sources such as right and left microphones, stereophonic magnetic tape or stereophonic phonograph record pickups or the like. The stereophonic sub-carrier generator shown in the drawing performs essentially five functions: (1) the pre-emphasis of the right and left signals; (2) the matrixing of the right and left signals to provide sum and difference signals; (3) the generation of a 38 kc. subcarrier wave and a 19 kc. pilot tone; (4) the double sideband suppressed carrier amplitude modulation of the 38 kc. subcarrier by the difference signal; and (5) the combining in the proper proportions of the sum signals, the subcarrier sidebands, and the 19 kc. pilot tone. The resultant composite output signal noted in (5) above is developed at a pair of output terminals 14 which are adapted to be connected to the exciter of an FM transmitter, not shown.

In the following description of the stereophonic subcarrier generator, the subcarrier wave and pilot tone generating portions of the circuit will be considered first, followed by consideration of the matrix, the balanced modulator, and the combining circuits.

The only active devices used in the entire apparatus are two electron tubes (four tube sections) found in the subcarrier wave and pilot tone generating circuits. The first tube section is a pentode connected in a crystal controlled oscillator circuit 16 which oscillates at 38 kc. The oscillator circuit may be of any known type providing sufficiently good frequency stability of the generated subcarrier to satisfy the FCC standards. The 38 kc. signal developed by the oscillator circuit is fed to a second tube section which is connected to operate as a buffer amplifier 18. The 38 kc. oscillator signal output of the buffer amplifier 18 is fed by way of the conductors 19 and 20 to a balanced modulator circuit.

The 38 kc. signal from the oscillator circuit 16 is also fed to a frequency divider stage 22 which includes the third and fourth tube sections. The frequency divider stage 22 is of known design and is adapted to be synchronized by the applied 38 kc. signal to deliver an output signal of 19 kc. to a resonant circuit 24 which is tuned to 19 kc. The tuned circuit 24 is coupled through a transformer 26 to a variable resistor 28. The secondary winding of the secondary transformer 26 and the resistor 28 comprise a pilot tone output circuit 30. Although the frequency divider stage 20 operates essentially as a multivibrator, the ringing action of the resonant circuit 24 causes a substantially pure sine wave to be developed and fed to the pilot tone output circuit 30.

The power supply for developing direct current (D.-C.) plate voltage and alternating current (A.-C.) filament voltage for the four tube sections includes a power transformer 32 having a primary winding to which the power line A.-C. voltage is applied. The power transformer has a first secondary winding 34 which is connected to a bridge rectifier 36 for developing the B+ voltage for the four tube sections. The B+ voltage is filtered by a resistance-capacitance filter 38 and applied to a shunt voltage regulator comprising a Zener diode 40. Since there are no amplifier devices in the other portions of the subcarrier generator, substantially less filtering is required to prevent 60 and 120 cycle hum from being introduced in the signal channels. Filament voltage for the tube sections is derived from a second secondary winding 42 on the transformer 32, the terminal on the winding 42 marked X being connected by conductors not shown to correspondingly marked terminals of the tube filaments. A pilot light 44 connected across the secondary winding 42 indicates when power is applied to the apparatus.

The left and right audio frequency signals applied to the input terminals 12 and 10 respectively are passed through suitable pre-emphasis networks 46 and 48 which may be of any suitable design. The pre-emphasis networks 46 and 48 have a time constant of about 75 microseconds, and operate to attenuate the higher audio frequency signals to a lesser extent than the lower frequency audio signals. As is known, the high frequency pre-emphasis enables improved signal-to-noise ratio for the higher frequency signals reproduced at the receiver.

The pre-emphasized audio frequency signals from the networks 46 and 48 are fed respectively to coupling transformers 50 and 52, the secondary windings of which are coupled to a matrixing network for adding the left (L) signal and the right signal (R) to produce a sum signal $(L+R)$, and subtracting the left and right signals to produce a difference signal $(L-R)$.

The matrixing network includes four transformers 54, 56, 58, and 60 all having similar electrical characteristics. As shown by the dotted lines in the drawing, the windings of the transformers 54 and 58 are on the same core and may in actual practice be a single transformer having two separate primary and two separate secondary windings. In like manner, the windings of the transformers 56 and 60 are shown as being wound on the same core. The transformers 50–60 are well shielded to prevent pickup of hum caused by stray sixty cycle fields.

The primary windings of the transformers 56–60 are connected to form a bridge circuit, having a first pair of diagonal terminals A—A and a second pair of diagonal terminals B—B. The pre-emphasized left signal appearing at the winding 50a of the transformer 50 is applied across the diagonal terminals A—A of the bridge, and the pre-emphasized right signal from the secondary winding 52a of the transformer 52 is applied across the diagonal terminals B—B. With the connections as shown, the sum signals are developed in the primary winding of the transformers 54 and 58 and the difference signals are developed in the primary windings of the transformers 56 and 60.

To understand the operation of the matrix network it should be noted that like right and left signals produce like polarities of voltage at the upper terminals of the secondary windings 50a and 52a of the coupling transformers 50 and 52. It can be seen by tracing the current flow caused by the like right and left signals through the transformer 54–60 primary windings, that these currents add in the primary windings of the transformers 54 and 58 and subtract in the primary windings of the transformers 56 and 60.

The connections from the primary winding 50a to the bridge network includes a resistor 62 which provides accurate impedance matching. In like manner, a fixed resistor 64 and a variable resistor 66 connects the secondary winding 52a to the diagonal terminals B—B of the bridge network to provide impedance matching. In the circuit shown, each of the primary windings of the transformers 54–60 have a value of 600 ohms, thus presenting an impedance of 300 ohms between the diagonal terminals. The secondary windings 50a and 52a of the circuit were tapped to present a total impedance of 333 ohms so that the impedance will be exactly matched from the secondary winding 50a to the diagonal terminals A—A of the bridge with a resistance of 33 ohms for the resistor 62. The same is true for the secondary windings 52a to the diagonal terminals B—B of the bridge except that the variable resistor 66 is adjustable to balance the matrixing network for high frequency audio signals, such as those of the order of 12 kc. which may have been unequally translated by the pre-emphasis and other coupling circuits.

The sum $(L+R)$ signal developed in the primary winding of the transformers 54 and 58 is induced in the secondary windings 54a and 58a. These secondary windings are connected in series aiding relation to apply the total sum signal to a time delay network 68.

In like manner the difference signal is induced in the secondary windings 56a and 60a of the transformers 56 and 60. The windings 56a and 60a are connected in series aiding relation across the diagonal terminal C—C of a bridge network formed by four diodes 70, 72, 74 and 76. Four matched diodes connected as shown may be purchased commercially as a unit known as a diode "quad." The other diagonal D—D of the diode bridge is connected across the primary winding 78a of an output transformer 78 which may have bifilar wound primary and secondary windings. The primary winding 78a comprises two like portions which are connected together by two parallel resistors, a fixed resistor 80 and a resistor 82 having an adjustable tap.

The series connected secondary windings 56a and 60a of the matrix network, the diode network, and the output transformer 78 are connected to operate as a ring modulator. To this end, 38 kc. signals from the buffer amplifier stage 18 are fed through the conductor 20 to the variable tap on the resistor 82, and through the conductor 19 to the junction of the secondary windings 56a and 60a. The 38 kc. signal amplitude is large relative to that of the difference signal $(L-R)$, so that the 38 kc. signal serves as a switching voltage to control the conductivity of the diodes 70–76. When the conductor 20 is driven positive by the 38 kc. signal the diodes 72 and 76 are conductive and the diodes 70 and 74 are reverse biased. When the conductor 20 is driven negative the reverse is true in that the diodes 72 and 76 are cut off and the diodes 70 and 74 conduct.

It will be seen that the switching action causes equal and opposite currents at 38 kc. to flow in the two halves of the primary winding 78*a*, so that the 38 kc. subcarrier component is balanced out. The tap on the resistor 82 may be adjusted to minimize any residual 38 kc. signal that may appear in the secondary winding 78*b* of the transformer 78.

The signals appearing across the secondary winding 78*b* comprise the subcarrier double sidebands representative of a difference signal, and some higher order harmonic components. Accordingly, the secondary winding 78*b* is coupled through a bandpass filter network 84 to an output circuit 85 comprising a fixed resistor 86 connected in series with a resistor 88 with an adjustable tap. Assuming full range audio frequency input signals at the terminals 10 and 12, i.e., 0–15 kc., the bandpass filter network is designed to pass signals in frequency range of 38 kc.±15 kc. or from 23 to 53 kc. The filter removes the higher order components referred to above and in addition provides symmetrical response at both ends of the bandpass frequency range.

As mentioned previously, the sum $(L+R)$ signals are applied to a time delay network 68. The time delay network delays the sum signal $(L+R)$ to compensate for delays in the difference signal $(L-R)$ through the bandpass filter network 84. The sum signal output circuit comprises a resistor 90.

An important feature of the invention is the manner in which the time delay in the sum channel is matched to that which occurs through the bandpass filter network 84 in the difference channel. The bandpass filter 84 comprises in this embodiment a seven pole Tchebychev bandpass filter network having .01 db variation in amplitude response over about a 30 kc. range of the bandpass frequency response thereof. The arithmetic center frequency of the network 84 is 38 kc. and has a bandwidth of 36 kc. between points wherein the response of the filter is 3 db down. The design and construction of Tchebychev filters per se is well known in the art.

The envelope delay of the bandpass filter 84, shown and described, is substantially constant for sideband signals resulting from the modulation of the subcarrier by audio signals up to about 9 kc. For sidebands resulting from audio signals above 9 kc., the envelope time delay is a non-linear function of the frequency of the modulating signal.

Although it is possible to design the bandpass filter 84 to exhibit substantially constant envelope time delay for sidebands resulting from modulating signals over the entire audio frequency range of 0–15 kc., such a filter would have a wider frequency bandwidth, thus passing some of the higher order components from the ring modulator. These components fall in a frequency range which may be utilized for the transmission of another subcarrier, which may for example, have a subcarrier frequency of 67 kc.

To maintain the proper left vs. right channel separation as required by the FCC Rules and Regulations, a signal of a given frequency in the sum channel must be delayed by the same amount as the difference signal sideband envelope which results from a signal of said given frequency, and the proper amplitude relation between the sum signal and the difference signal sidebands must be maintained. The first requirement is complicated by the fact that the bandpass filter 84 does not have a linear time vs. frequency delay characteristic as noted above.

The time delay network 68 in the sum signal channel comprises a 7 pole Tchebychev low pass filter having a .01 db variation in amplitude response over approximately 15 kc. of its passband. The response of the delay network 68 is 3 db down at 18 kc. This provides a time delay vs. frequency characteristic in the sum signal channel which is complementary to that occuring through the bandpass network 84 in the difference signal channel as well as a substantially matching amplitude vs. frequency response characteristic. In this manner signals of the same frequency in the sum and difference channels are delayed and attenuated by substantially the same amount to provide the necessary left vs. right channel separation.

In the foregoing description, three output circuits have been described: the pilot tone output circuit 30 providing the 19 kc. pilot tone; the subcarrier sideband output circuit 85 including double sideband amplitude modulated suppressed subcarrier signals in the range of 23–53 kc.; and the sum $(L+R)$ signal output circuit 90 having audio frequencies in the range of 0–15 kc. The pilot tone output circuit 30 and the subcarrier sideband output circuit 85 are floating with respect to ground, but one side of the resistor 90 which is in the sum signal output circuit is connected to a point of reference potential indicated as ground. This feature permits simple and effective combining of the various signals by connecting the three output circuits in series. To this end the high signal potential side of the resistor 90 is connected to one end of the resistor 86. The adjustable tap on the resistor 88 is in turn connected to one end of the resistor 28. One of the output terminals 14 is connected to the tap on the resistor 28, and the other output terminal is at ground potential. The amplitudes of the pilot tone and subcarrier sideband signals relative to the sum signal amplitude can be selected by adjustment of the taps on the resistors 28 and 88 respectively. Thus, the three output circuits are effectively connected in series between the output terminals 14, and the relative proportions of the three signals may easily be set by potentiometric adjustment.

The fact that the composite signal is available at the output terminals 14 of the subcarrier generator facilitates simple and direct measurement of the individual components of the composite signal to enable proper proportioning thereof by adjustment of the taps on the resistors 28 and 88. The proper proportioning of the individual components of the composite signal is necessary to maintain left vs. right signal channel separation.

The terminals 14 are adapted to be connected to the exciter of an FM transmitter, not shown, and the composite signal from the output terminals 14 is used to frequency modulate a carrier wave generated in the transmitter. In some existing monophonic transmitters, it may be necessary to modify the exciter circuit to extend its frequency response from 5 to 100,000 cycles. The reason for this is that the standards for the transmission of stereophonic signals requires 29.7 db left vs. right channel separation. For the $L+R$ signal, a phase error of 3° from linear phase is permissible at 50 c.p.s. To meet this requirement, the low frequency response of the exciter should extend approximately to 5 c.p.s. For proper separation at the high frequency end of the audio range similar extensions in frequency response must be made with respect to the sideband representing the $L-R$ signal. It is well within the skill of one working in the art to modify or design an exciter for an FM transmitter satisfying the above noted frequency response requirements. Although circuits in accordance with the invention are useful for adapting existing monophonic FM transmitters for the transmission of stereophonic signals, it should be understood that the invention is also applicable to stereophonic subcarrier signal generators for transmitters designed specifically to transmit stereophonic signals.

What is claimed is:

1. A matrix circuit for a stereophonic system comprising a pair of input terminals one for each of a pair of stereophonically related signals, means providing four inductive windings connected to form a bridge circuit, means coupling one of said pairs of input terminals across one diagonal of said bridge circuit, means coupling the other of said pairs of input terminals across another diagonal of said bridge circuit, means coupled to two of said windings oppositely connected in said bridge circuit for deriving a signal corresponding to the sum of said stereophonically related signals, and means coupled to the remaining two of said windings for deriving a signal corresponding to the difference between said stereophonically related signals.

2. A matrix and balanced modulator circuit for a stereophonic signal transmission system for a stereophonic system comprising a pair of input circuits one for each of a pair of stereophonically related signals, means providing four inductive windings connected to form a bridge circuit, means coupling one of said input circuits across one diagonal of said bridge circuit, means coupling the outer input circuit across another diagonal of said bridge circuit, means coupled to two of said windings oppositely connected in said bridge circuit for deriving a signal corresponding to the sum of said stereophonically related signals, means providing a balanced modulator including the remaining two of said windings, means providing a source of subcarrier wave energy, coupled to said balanced modulator, and an output circuit for said balanced modulator.

3. A balanced modulator circuit for a stereophonic signal transmission system for a stereophonic system comprising a pair of input circuits one for each of a pair of stereophonically related signals, means providing four inductive windings connected to form a bridge circuit, means coupling one of said input circuits across one diagonal of said bridge circuit, means coupling the other input circuit across another diagonal of said bridge circuit, a balanced modulator including means coupled to two of said windings oppositely connected in said bridge circuit for deriving a signal corresponding to the difference of said stereophonically related signals, means providing a source of subcarrier wave energy coupled to a balanced modulator, and an output circuit for said balanced modulator.

4. A stereophonic subcarrier generator comprising a first and second input circuits for left and right stereophonic signals respectively;

first, second, third and fourth transformers each having primary and secondary windings, a first series circuit comprising the primary windings of said first and second transformers, a second series circuit comprising the primary windings of said third and fourth transformers, said first and second series circuits being connected in parallel so that said third transformer primary winding is connected to said second transformer primary winding and said fourth transformer primary winding is connected to said first transformer primary winding, means coupling said first input circuit between the junction of the primary windings of said first and fourth transformers and the junction of the primary windings of said second and third transformers, means coupling said second input circuit between the junction of the primary windings of said first and second transformers and the junction of the primary windings of said third and fourth transformers, whereby the difference between said left and right signals is developed across said second and fourth transformers primary windings, means connecting the secondary windings of said second and fourth transformers in series, an output circuit including an output transformer having primary and secondary windings, a plurality of unidirectional conducting devices, means connecting the secondary windings of said second and fourth transformers, said unidirectional conducting devices and the primary winding of said output transformer as a balanced modulator, and a source of subcarrier wave energy coupled to said balanced modulator whereby amplitude modulated suppressed carrier sidebands representative of the difference between said left and right signals are developed across the secondary winding of said output transformer.

5. A stereophonic subcarrier generator comprising a first and second input circuits for left and right stereophonic signals respectively;

first, second, third and fourth transformers each having primary and secondary windings, a first series circuit comprising the primary windings of said first and second transformers, a second series circuit comprising the primary windings of said third and fourth transformers, said first and second series circuits being connected in parallel so that said third transformer primary winding is connected to said second transformer primary winding and said fourth transformer primary winding is connected to said first transformer primary winding, means coupling said first input circuit between the junction of the primary windings of said first and fourth transformers and the junction of the primary windings of said second and third transformers, means coupling said second input circuit between the junction of the primary windings of said first and second transformers and the junction of the primary windings of said third and fourth transformers, whereby the difference between said left and right signals is developed across said second and fourth transformer primary windings, a ring modulator including means connecting the secondary windings of said second and fourth transformers in series, an output transformer having primary and secondary windings, a plurality of unidirectional conducting devices, means connecting the secondary windings of said second and fourth transformers, said unidirectional conducting devices and the primary winding of said output transformer as a balanced modulator, and a source of subcarrier wave energy coupled between the junction of the secondary windings of said second and fourth transformers and a point substantially midway between the ends of the primary winding of said output transformer, whereby amplitude modulated suppressed carrier sidebands representative of the difference between said left and right signals are developed across the secondary winding of said output transformer.

6. A stereophonic subcarrier generator comprising a first and second input circuits for left and right stereophonic signals respectively; matrix network means for combining said left and right signals to produce a difference signal representative of the difference between said left and right signals and a sum signal representative of the sum of said left and right signals, a balanced modulator including an input circuit coupled to said matrix means to receive said difference signal, means providing a source of subcarrier wave energy coupled to said balanced modulator, an output circuit for said modulator across which is developed amplitude modulated suppressed carrier sidebands representative of said difference signal, means coupled to said matrix network providing an output circuit for said sum signal, means providing a source of pilot tone energy of a frequency which is a submultiple of said subcarrier wave energy frequency, a pilot tone energy output circuit coupled to said pilot tone energy source, a pair of output terminals for said stereophonic subcarrier wave generator, and means coupling said modulator output circuit said sum signal output circuit and said pilot tone output circuit in series across said output terminals for said stereophonic subcarrier generator.

7. A stereophonic subcarrier generator comprising a first and second input circuits for left and right stereophonic signals respectively;

first, second, third and fourth transformers each having primary and secondary windings, a first series circuit comprising the primary windings of said first and second transformers, a second series circuit comprising the primary windings of said third and fourth transformers, said first and second series circuits being connected in parallel so that said third transformer primary winding is connected to said second transformer primary winding and said fourth transformer primary winding is connected to said first transformer primary winding;

means coupling said first input circuit between the junction of the primary windings of said first and fourth transformers and the junction of the primary windings of said second and third transformers, means coupling said second input circuit between the junction of the primary windings of said first and second transformers and the junction of the primary windings of said third and fourth transformers, whereby the difference between said left and right signals is developed across said second and fourth transformer primary windings and the sum of said left and right signals is developed across the primary windings of said first and third transformers;

a ring modulator including means connecting the secondary windings of said second and fourth transformers in series, first, second, third and fourth diodes each having an anode and a cathode, means connecting the first and second diodes in series across the secondary windings of said second and fourth transformers so that the cathode of the first diode is connected to the anode of the second diode, means connecting the third and fourth diodes in series across the secondary winding of said second and fourth transformers so that the cathode of the fourth diode is connected to the anode of the first diode and the anode of the third diode is connected to the cathode of the second diode, an output transformer having primary and secondary windings, said primary winding being connected between the junction of said first and second diodes and the junction between said third and fourth diodes;

a source of subcarrier wave energy coupled between the junction of the secondary windings of said second and fourth transformers and a point between the ends of the primary winding of said output transformer;

and a bandpass filter network coupled to the secondary winding of said output transformer, said bandpass filter network having an output circuit across which is developed double sideband amplitude modulated suppressed carrier sidebands representative of the difference between said left and right signals.

8. A stereophonic composite wave generator having output terminals and comprising:

first and second input circuits for left and right stereophonic signals respectively;

a matrix network including first, second, third and fourth transformers each having primary and secondary windings, said first and third transformers being wound on one core, and said second and fourth transformers being wound on another core, a first series circuit comprising the primary windings of said first and second transformers, a second series circuit comprising the primary windings of said third and fourth transformers, said first and second series circuits being connected in parallel so that said third transformer primary winding is connected to said second transformer primary winding and said fourth transformer primary winding is connected to said first transformer primary winding;

means coupling said first input circuit between the junction of the primary windings of said first and fourth transformers and the junction of the primary windings of said second and third transformers, means coupling said second input circuit between the junction of the primary windings of said first and second transformers and the junction of the primary windings of said third and fourth transformers, whereby the difference between said left and right signals is developed across said second and fourth transformer primary windings and the sum of said left and right signals is developed across the primary windings of said first and third transformers; a ring modulator including means connecting the secondary windings of said second and fourth transformers in series aiding relation for signals developed thereacross, first, second, third and fourth diodes each having an anode and a cathode, means connecting the first and second diodes in series across the secondary windings of said second and fourth transformers so that the cathode of the first diode is connected to the anode of the second diode, means connecting the third and fourth diodes in series across the secondary winding of said second and fourth transformers so that the cathode of the fourth diode is connected to the anode of the first diode and the anode of the third diode is connected to the cathode of the second diode, an output transformer having primary and secondary windings, said primary winding being connected between the junction of said first and second diodes and the junction of said third and fourth diodes;

a source of subcarrier wave energy having a frequency of 38 kilocycles, means for applying wave energy from said source between the junction of the secondary windings of said second and fourth transformers and a point between the ends of the primary winding of said output transformer;

a bandpass filter network coupled to the secondary winding of said output transformer, said bandpass filter network having an output circuit across which is developed double sideband amplitude modulated suppressed carrier sidebands representative of the difference between said left and right signals;

means connecting the secondary windings of said first and third transformers in series aiding relation for signals developed thereacross, a time delay network coupled to said first and third transformer secondary windings to provide a delay substantially equal to the delay for signals through said ring modulator and bandpass filter, said time delay network having an output circuit across which is developed the sum of said left and right stereophonic signals;

a frequency divider coupled to said source of subcarrier wave, said frequency divider having an output circuit across which signals of half the frequency of said subcarrier wave is developed;

and means coupling said bandpass filter output circuit, said time delay network output circuit, and said frequency divider output circuit in series across the output terminals of said stereophonic composite wave generator.

References Cited by the Examiner

UNITED STATES PATENTS 2,093,540 9/1937 Blumlein --------- 179—100.4

DAVID G. REDINBAUGH, *Primary Examiner.*